United States Patent [19]

Rudich, Jr. et al.

[11] Patent Number: 4,482,847
[45] Date of Patent: Nov. 13, 1984

[54] ELECTRICALLY-CONTROLLED ROTARY ACTUATOR

[75] Inventors: George Rudich, Jr.; Charles F. Beeson, both of Goshen; Gary L. Bartley, Elkhart, all of Ind.

[73] Assignee: Johnson Service Company, Milwaukee, Wis.

[21] Appl. No.: 469,929

[22] Filed: Feb. 25, 1983

[51] Int. Cl.³ .............................................. G05B 1/06
[52] U.S. Cl. ...................................... 318/9; 318/681; 310/68 B
[58] Field of Search ...................... 318/9, 14, 15, 663, 318/665, 667, 681; 310/68 B

[56] References Cited

U.S. PATENT DOCUMENTS

| 3,609,498 | 9/1971 | Andresen, Jr. | 318/665 |
| 3,736,486 | 5/1973 | Gould et al. | 318/681 |
| 4,190,792 | 2/1980 | Chan | 318/663 |
| 4,207,507 | 6/1980 | Hermle | 318/663 |
| 4,289,996 | 9/1981 | Barnes et al. | 318/8 |

OTHER PUBLICATIONS

IBM Technical Disclosure Bulletin, vol. 10 (2), Jul. 1967, by Wilford et al.

Primary Examiner—J. V. Truhe
Assistant Examiner—Bentsu Ro
Attorney, Agent, or Firm—John Phillip Ryan; Larry L. Shupe; Joseph J. Jochman, Jr.

[57] ABSTRACT

A motor-driven rotary actuator includes an electric drive motor adapted to be configured for providing one of a plurality of output torques and power transmission means including a rotatable output shaft. The transmission means is coupled to the drive motor and includes drive elements adapted to be formed of disparate materials selected for transmitting one of the output torques. An electric controller is coupled to the motor for providing rotation positioning control of the actuator output shaft in response to analog command signals.

10 Claims, 26 Drawing Figures

| DRIVE ELEMENT NUMBER | 35 lb-in OUTPUT TORQUE | 75 lb-in OUTPUT TORQUE | 150 lb-in OUTPUT TORQUE |
|---|---|---|---|
| PINION 63 | CS | CS | CS |
| PINION 95 | CS | CS | CS |
| PINION 137 | PL | PM | PM |
| PINION 139 | PM | PM | PM |
| PINION 141 | PM | PM | CS |
| BULL 89 | PL | PL | PL |
| BULL 142 | PL | PM | PM |
| BULL 143 | PL | PM | PM |
| BULL 145 | PM | PM | PM |
| BULL 93 | PM | PM | CS |

CS - CUT STEEL
PL - PLASTIC
PM - POWDERED METAL

ELECTRICALLY-CONTROLLED ROTARY ACTUATOR

BACKGROUND OF THE INVENTION

This invention relates generally to actuators for positioning control of devices coupled thereto and more particularly to electrically controlled actuators for positioning of valves, mechanical dampers and the like as employed in process control systems. The invention is particularly suited for use in systems related to heating, ventilating and air conditioning applications.

Process control systems frequently employ valves which may be positionably adjusted for controlling the flow of fluids within a conductor system such as a pipeline. Other types of fluid flow controlling devices often encountered in process control systems include dampers which may be actuated for controllably modulating the flow of gases therethrough. One type of process control system in which the rotary actuator of the present invention may be advantageously used includes heating, ventilating and air conditioning (HVAC) systems which usually employ a plurality of air handling units comprising interconnected ductwork having mechanical dampers associated therewith. The ductwork and dampers cooperate for controlling the flow of outside ambient air into a conditioned space, for controlling the flow of air from the space to the ambient and for controlling air flow between cool and warm air ducts. HVAC systems also employ actuator-positioned valves whereby the flow of chilled or heated water through heat exchanger coils may be controlled in accordance with the air temperature which is desired to be maintained as the air passes over such coils for air temperature-regulating purposes. Liquid flow control valves and fluid controlling dampers of the aforementioned type are available in a wide variety of sizes and torque requirements, such sizes being generally related to the size of the air handling unit with which they may be associated. While it is known to utilize electrically-driven-rotary actuators for positioning such valves and dampers, the wide range of torque requirements of such devices has heretofore necessitated that such actuators be configured in a variety of drive motor torque output ranges, enclosure sizes and gearing arrangements. Further, the relatively recent advent of sophisticated control equipment including computerized direct digital control systems utilizing algorithms for effecting sophisticated control strategies has required that such rotary actuators have the capability of being readily adapted to respond to and be controlled by low voltage analog or digital signals. The result of these widely disparate application requirements has been a proliferation of electrically-controlled rotary actuators which impose unnecessary complexities upon the manufacturing, warehousing and field installation functions.

An electrically-controlled rotary actuator which takes maximum advantage of parts commonality and is adapted to be configured for providing any one of several rated output torques, which includes a power transmission having drive elements capable of being formed of several disparate materials selected in view of such torque requirements and which is adapted to receive a variety of electric controls arranged in plug-in modular form for simplified manufacture, inventory and field installation would be a significant advance over the prior art.

SUMMARY OF THE INVENTION

In general, the motor-driven rotary actuator of the present invention includes an electric drive motor adapted to be configured for providing one of a plurality of output torques. A power transmission including a rotatable output shaft is coupled to the drive motor and includes drive elements adapted to be formed of disparate materials selected for transmitting a particular output torque. An electric controller is coupled to the drive motor for providing rotation positioning control of the actuator output shaft in response to analog command signals. The controller is preferably embodied to include a plurality of circuit boards selectable for providing a variety of control configurations and adapted to be electrically coupled one to the other by multiple conductor plug-in connectors.

In the embodiments, a preferred drive motor is of the single phase, permanent split capacitor type which may be adapted by suitable stator winding configuration and phase-shifting capacitor selection to provide any one of several rated output torques. A multiple-gear power transmission including an output shaft is coupled to the drive motor and includes a plurality of gear elements which may be formed of cut steel, powdered metal and/or a plastic material with the material of specific gear elements being selected in view of the desired actuator output torque. The gear elements and their related support shafts utilize the same shaft centerlines and mounting structure irrespective of the materials from which the elements may be formed.

In a first preferred embodiment, the electric controller includes a first control circuit having means for generating a signal representative of the actual angular position of the output shaft and static switching means for controllably de-energizing the drive motor. A second control circuit is electrically coupled to the first control circuit, is responsive to proportional voltage signals and includes signal shift circuit means for selectively converting a first input voltage signal occurring within a predetermined first range to a second input voltage within a predetermined second range in a manner such that a second voltage within the second range is representative of a first voltage within the first range. A separately mounted first terminating means may be provided for simplified attachment of field wiring brought into the actuator enclosure.

In the electric controller of other preferred embodiments, the second control circuit and the first terminating means may be replaced by other control circuits adapted for providing other, specific control modes. Spring return and retarder brake assemblies may optionally be incorporated as dictated by the requirements of the specific application. The spring return assembly may be coupled to the exterior of a common housing adapted to accommodate the drive motor, power transmission and electric controller of the embodiments.

It is an object of the present invention to provide a motor-driven rotary actuator which overcomes the aforementioned disadvantages of the prior art.

Another object of the present invention is to provide a rotary actuator which includes a drive motor adapted to be configured for providing one of a plurality of output torques.

Yet another object of the present invention is to provide a rotary actuator having a power transmission which includes drive elements adapted to be formed of disparate materials selected for the transmission of one of several output torques.

Still another object of the present invention is to provide a rotary actuator which includes an electric controller for providing rotation positioning control of the actuator output shaft.

Another object of the present invention is to provide a rotary actuator wherein a variety of electronic control panels may be received within a common actuator housing.

Yet another object of the present invention is to provide a motor-driven actuator which may be readily adapted to a variety of process control strategies.

Still another object of the present invention is to provide a rotary actuator which may be adapted to one of a variety of control configurations by using plug-in circuit boards.

Another object of the present invention is to provide a rotary actuator which may be readily adapted to incorporate spring return and retarder brake features. These and other objects of the present invention will become more apparent from the detailed description thereof taken with the accompanying drawing.

DETAILED DESCRIPTION OF THE PREFERRED EMBODIMENTS

Figure 1:
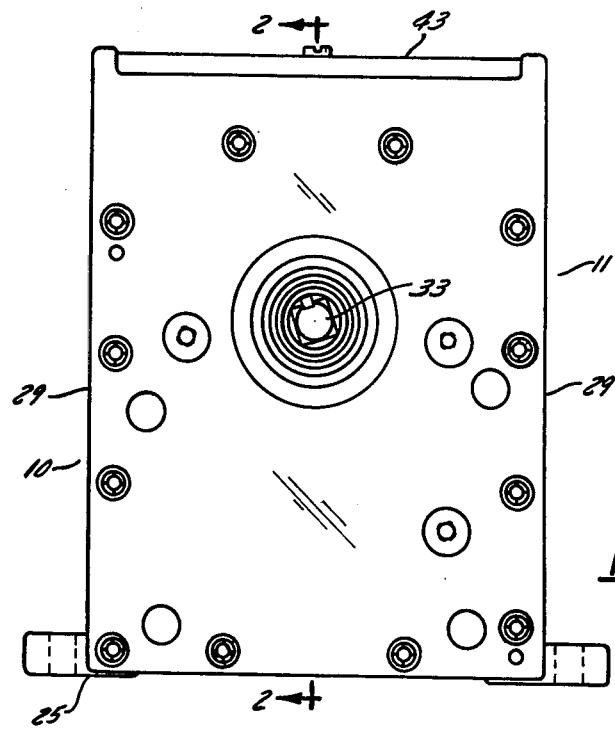
FIG. 1 is a front elevation view of the actuator of the present invention.
Figure 2:
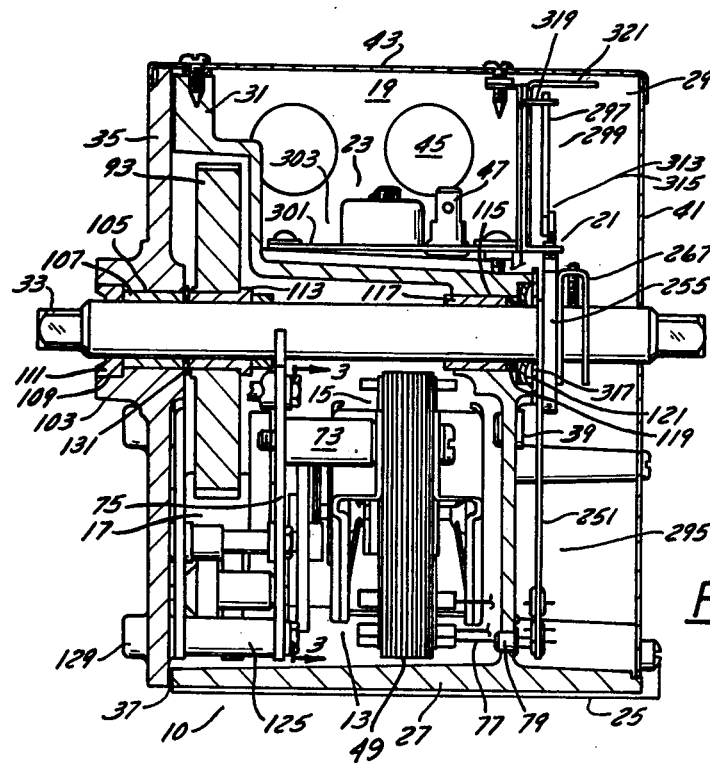
FIG. 2 is a side elevation view of the actuator of FIG. 1 taken substantially along the plane 2—2 thereof with portions shown in cross-section and other portions shown in full representation.

Referring to FIGS. 1 and 2 and particularly to FIG. 2, the actuator 10 is shown to include a partitioned enclosure 11 having a first compartment 13 for receiving the electric drive motor 15 and power transmission 17 and a second compartment 19 for receiving the electric controller 21 and termination board 23 components. The enclosure 11 includes a housing 25 having a base member 27, a pair of vertically disposed generally parallel side members 29 arranged in spaced relationship one to the other and a partition 31 for supporting the output shaft 33 and for defining a barrier between the first compartment 13 and the second compartment 19. While the base member 27, the side members 29 and the partition 31 may be formed as separate pieces for assembly, it is preferred that the housing 25 be formed as an integral unit as, for example, by die casting. The power transmission 17 includes a generally planar face member 35 adapted to abut the base member 27, the side members 29 and the partition 31 to define the first compartment 13. An oil seal 37 is disposed between the face member 35 and the base member 27, side members 29 and partition 31 for the retention of lubricating oil which may be introduced into the first compartment 13 through a fill hole sealable by a plug 39. A generally planar end panel 41 and top panel 43 cooperate with the partition 31, the face member 35 and the side members 29 for defining the second compartment 19 used for receiving the electric controller 21 components. An optional control transformer (not shown) may be incorporated upon the top panel 43 to accommodate line voltages other than those for which the motor 15 is constructed. A termination board 23 is received atop the partition 31 for the connection of field wiring brought into the enclosure 11 through apertures 45 within a side member 29 and such connection may be directly to the terminals 47 or through the control transformer.

Figure 3:
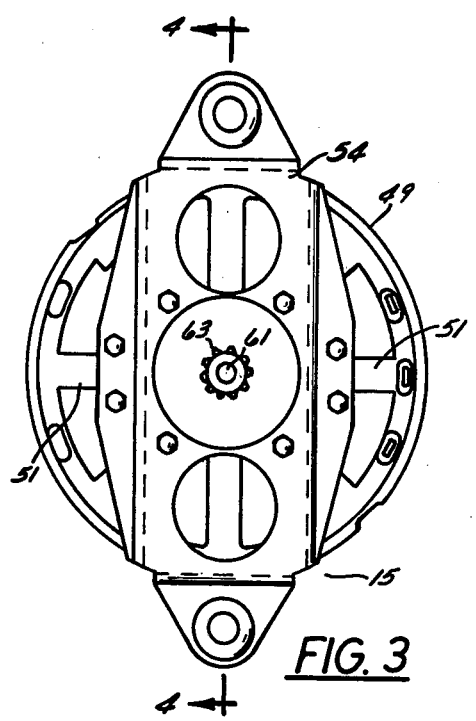
FIG. 3 is a front view of a first embodiment of the actuator drive motor taken along the plane 3—3 of FIG. 2.
Figure 4:
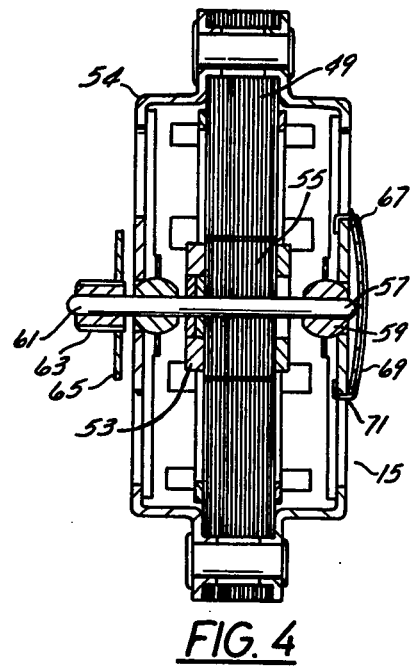
FIG. 4 is a side elevation view of the motor of FIG. 3 taken along plane 4—4 thereof and with portions shown in cross-section and other portions shown in full representation.

A first embodiment of the electric drive motor 15, useful in actuators incorporating a spring return feature, is shown in FIGS. 2, 3 and 4 to include a laminated stator 49 having multiple poles 51, a rotor assembly 53 and a pair of end brackets 54 for supporting the stator 49 and rotor assembly 53 in an operative relationship. The rotor assembly 53 includes a rotor 55 disposed upon a shaft 57 supported for rotation by a pair of generally spherical, self-aligning bearings 59, preferably of bronze. At its first, output end 61, the shaft 57 has a first pinion gear 63 affixed thereto for drivingly coupling the motor 15 with the power transmission means 17. The pinion gear 63 has a face disc 65 attached thereto at its first end 61, the disc 65 being utilized for braking as described in greater detail below. A bearing strap 67 is disposed adjacent the second end of the shaft 57 and is retained in contact with the shaft end by a clip 69 configured to engage elongate apertures 71 in the adjacent bracket 54. The bearing strap 67 may be formed of any suitable bearing material, as, for example, of nylon. In order to provide an acceptably long operating life of the bearing strap 67 and of the brake spring, described in detail below, it is preferred that both ends of the motor shaft 57 be hemispherically shaped and highly polished. The motor 15 is supported within the first compartment 13 upon spacers 73 or standoff studs (not shown) and is affixed to the power transmission second support plate 75 with suitable fasteners as, for example, by screws. For convenience in connecting the motor 15 to the electric control means 21, the motor leads 77 may be brought out through the partition 31 using insulated feedthrough studs 79.

Figure 5:
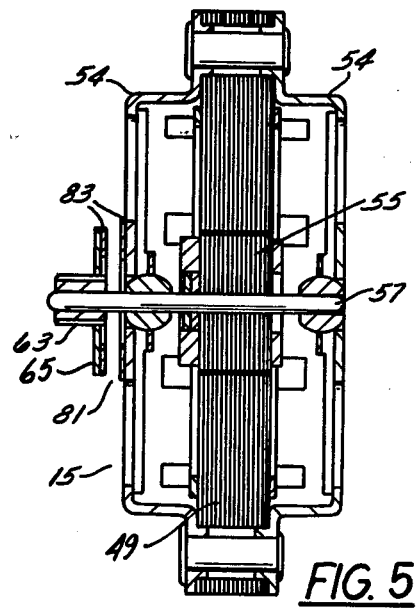
FIG. 5 is a side elevation view of a second embodiment of the motor and generally corresponding to the plane of view of FIG. 4.
Figure 7:
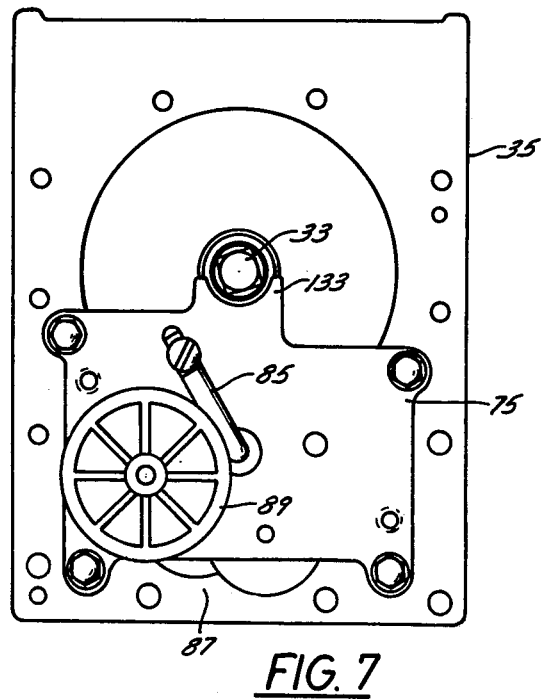
FIG. 7 is an end elevation view of the power transmission means taken along the plane 7—7 of FIG. 6 and further depicting a brake spring.

Referring next to FIGS. 2, 5 and 7, there is shown a second embodiment of the drive motor 15 useful in an actuator 10 from which the spring return feature is omitted and which is intended to retain the actuator output shaft 33 at an angular position upon motor de-energization. In the latter instance, it is preferred that a retarder brake 81 be arranged therewithin for retaining the actuator output shaft 33 at its last-commanded angular position during quiescent conditions when the motor 15 is de-energized. Accordingly, the motor 15 incorporates a pair of opposingly arranged braking surfaces 83, one each disposed upon the inward surface of the face disc 65 and upon a portion of the outward surface of the adjacent bracket 54. By the omission of the strap 67 and clip 69 of FIG. 4, the motor shaft 57 is permitted to move longitudinally in a first, brake-engaging direction under the urging of a leaf type brake spring 85 and during those periods when the motor 15 is de-energized. Movement of the shaft 57 and rotor 55 in this manner will result in a slight displacement of the rotor 55 to a position somewhat laterally off center with respect to the stator 49 and its magnetic field. Upon motor energization, the rotor 55 will seek the center position of maximum field strength, resulting in slight movement of the rotor 55 and shaft 57 to overcome the urging of the brake spring 85 and disengage the braking surfaces 83.

In order to provide a rotary actuator 10 capable of exhibiting any one of a plurality of output torques and yet provide a construction having a manufactured cost consistent with each, it is preferred that the drive motor 15 be of the single phase, permanent split capacitor type whereby any one of a plurality of output torques may be achieved by appropriate selection of the stator winding wire size and number of turns and by the selection of the appropriate phase shifting capacitor. The windings are electrically insulated from the poles by a dielectric material disposed therebetween such as by plastic sleeves or the like (not shown). In the preferred embodiments, the drive motor 15 with spring return constructions omitted may have a first configuration for providing a preferred rated output shaft torque of 35 pound-inches within a preferred torque range of 25–55 pound-inches; a second configuration for providing a preferred rated output shaft torque of 75 pound-inches within a preferred torque range of 55–110 pound-inches and a third configuration for providing a preferred rated output shaft torque of 150 pound-inches within a preferred torque range of 110–160 pound inches. An 8-pole motor 15 is preferred for operation at 60 Hz, the motor 15 being internally connected to define two phases of four poles each.

Figure 6:
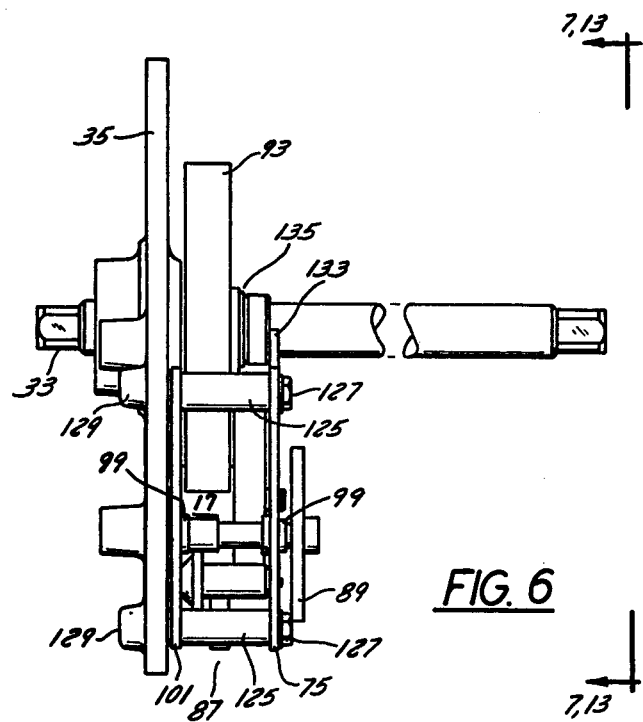
FIG. 6 is a side elevation view of the actuator power transmission means.
Figures 8, 9:
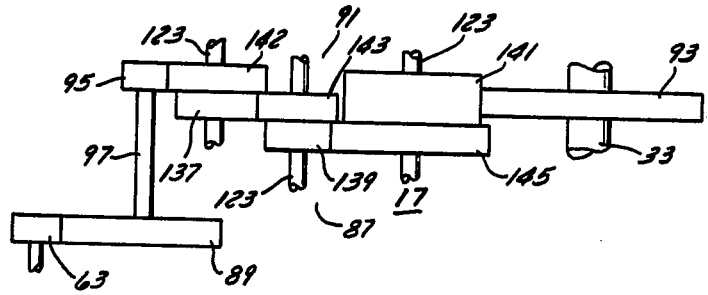
FIG. 8 is a mechanical schematic view of the drive elements of the power transmission means and further including the motor pinion gear.
FIG. 9 is a tabulation depicting preferred materials from which the drive elements of FIG. 8 may be formed.

Referring now to FIGS. 2, 6, 7 and 8, the power transmission means 17 is shown to include a face member 35 having a rotatable output shaft 33 protruding therethrough and a gear assembly 87 supported thereon for transmitting driving torque from the electric motor 15 to a valve, damper or other device coupled to the shaft 33 for positioning control. As best seen in FIGS. 6 and 8, the power transmission 17 includes a first bull gear 89 for driven engagement with the motor pinion gear 63, intermediate gear means 91 and an output bull gear 93 affixed to and concentric with the longitudinal centerline of the output shaft 33. The first bull gear 89 and its related, concentrically arranged first pinion gear 95 are affixed to a first spindle 97, the latter being rotatably supported by bronze bushings 99 disposed in apertures in the first plate 101 and second plate 75. As best seen in FIG. 2, the face member includes an enlarged shaft boss 103 having a first pocket 105 formed therein and sized to receive a suitable first bearing 107 with pressed fit. A second, enlarged pocket 109 is formed in the outer face of the boss 103 concentric with the first pocket 105 and the output shaft 33 and is sized to receive a lip-type oil seal 111 for the retention of lubricating fluid within the first compartment 13. When arranging the output bull gear 93 upon the shaft 33, it is preferable to interpose therebetween a bushing 113 having interior and exterior diameters selected to provide non-slip fits between the bushing 113, the shaft 33 and the gear 93. In similar fashion, the partition 31 includes a third pocket 115 formed therein and sized to receive a second bearing 117 with pressed fit, the first bearing 107 and the second bearing 117 thereby cooperating to rotatably support the output shaft 33. The shaft and motor bearings 59, 107, 117 may be of any suitable construction as, for example, sintered bronze, nylon or DELRIN, a trademarked product of E. I. Du Pont, preferably filled with a dry lubricant.

A sealing disk 119 and retaining washer 121 are disposed outwardly of the second bearing 117 in a suitable pocket formed in the partition 31 for providing lubricating oil retention. Those drive elements comprising the intermediate gear means 91 are arranged for rotatable, driving engagement one with the other and are rotatably disposed upon suitable hardened steel spindles 123 which are rigidly, nonrotatably supported between the first plate 101 and the second plate 75. The plates 75, 101 are maintained in a parallel, spaced-apart relationship by standoff tubes 125 with the gear assembly 87 being attached to the face member 35 by suitable fasteners 127 such as cap screws or bolts which extend through the standoff tubes 125 and are received within internally threaded bosses 129 formed in the face member 35. The output bull gear 93 and its associated first bearing 107 and output shaft 33 are restrained from significant longitudinal movement by an inwardly projecting shoulder 131 of the first bearing 107 on the one hand and by a restraining fork 133 on the other hand. Due to manufacturing tolerances, it may be desirable to place one or more shims 135 between the fork 133 and the bushing 113 in a known manner to provide a specified maximum end play. The fork 133 is formed in the second plate 75 and has an upwardly projecting dimension selected to overlap the face end of the shaft bushing 113 or a shim 135, as the case may be. The length of the shaft bushing 113 is preferably selected to be only slightly less than the distance between the inward shoulder 131 of the first bearing 107 and the opposing, inward face of the restraining fork 133. When constructed and arranged in this manner, the output bull gear 93 will be maintained in full driven engagement with the intermediate gear means 91 while yet providing sufficient space between the bearing 107 and the bushing 113 and between the bushing 113 and the fork 133 so as to permit free shaft rotation and also to permit lubricating fluid to flow therebetween.

While the number of gear reductions between the motor pinion gear 63 and the output bull gear 93 may be only one reduction or a plurality thereof, the power transmission means 17 of the preferred embodiment comprises ten driving elements, including the motor pinion gear 63 and the output bull gear 93, arranged to provide five gear reductions resulting in an overall ratio of about 3200 revolutions of the motor shaft 57 for each revolution of the output shaft 33.

A unique feature of the power transmission means 17 is that its drive elements are adapted to be formed of disparate materials which result in lowered manufactured cost and acceptable field life consistent with the wide variety of torques required to be transmitted thereby. Further, the spindles 97, 123 including the output shaft 33 used to support the drive elements are disposed upon rotational axes, the locations of which remain fixed irrespective of the material from which the drive elements are formed.

FIG. 9 comprises a table depicting the materials used to form the various drive elements for each of the three output torque ranges of the preferred embodiments. Pinion gears 63, 95, 137, 139 and 141 and bull gears 89, 142, 143, 145 and 93 of FIG. 8 correspond to those same elements in FIG. 9.

With respect to the drive elements formed of plastic, appropriate materials may include a DELRIN 500 acetal compound or of 6/6 nylon, glass and TEFLON filled as available from LNP Corporation under catalog number RFL4036. DELRIN and TEFLON are trademarks of E. I. Du Pont. Error tolerance for composite error and functional tooth thickness of all drive elements is to be determined by the composite method of gear inspection as described in Appendix A of the AGMA Gear Handbook, Volume 1, AGMA 390.03 of 1972. AGMA class 1 master gear with type 2 calibration is preferred.

Figure 10:
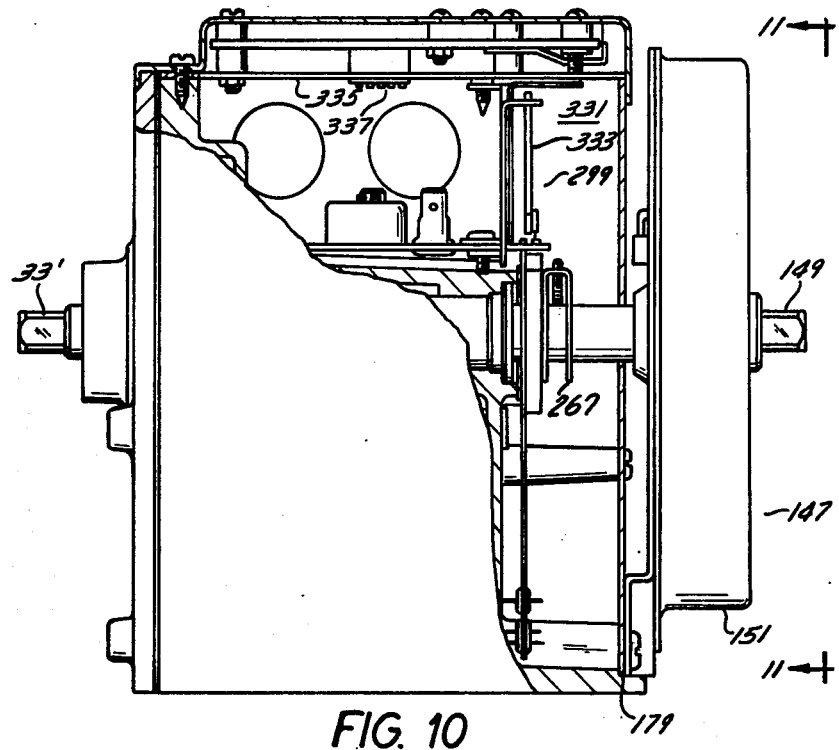
FIG. 10 is a side elevation view generally of the actuator of FIG. 1 taken along the plane 2—2 thereof and further generally depicting the optional spring return mechanism and the location of additional circuit boards used in certain embodiments, with portions shown in cross section, other portions broken away and yet other portions shown in phantom.
Figures 11, 12:
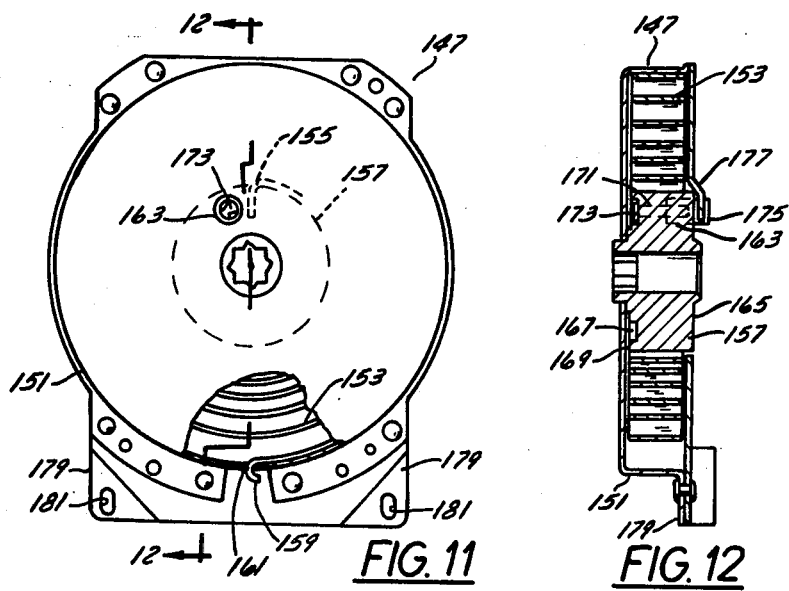
FIG. 11 is a view of the spring return mechanism taken along the plane 11—11 of FIG. 10 with portions shown in cross-section, other portions broken away and yet other portions shown in phantom.
FIG. 12 is a cross-sectional view of the spring return mechanism taken along the line 12—12 of FIG. 11.

Referring next to FIGS. 2, 10, 11 and 12, it may be desirable in certain applications to cause the actuator output shaft 33 to be returned by spring force to a predetermined reference position whenever the drive motor 15 is de-energized. In that event, an elongated output shaft 33' may be substituted for that of standard length to permit the mounting of a spring return assembly 147 upon the auxiliary shaft end 149 opposite the output end. A preferred spring return assembly 147 is shown in FIGS. 11 and 12 to include a housing member 151 for confining a spring 153 having a first tang end 155 thereof in torque transmitting engagement with a hub 157 formed on the output shaft 33' adjacent the auxiliary end 149. A second tang end 159 engages a notch 161 formed in the housing member 151 for spring retention. While a variety of spring arrangements such as coiled wire springs, spring loaded levers and the like may be used for positioning the output shaft 33', a preferred spring return assembly 147 includes a spirally wound spring 153 formed of a flat ribbon, preferably metallic.

Referring particularly to FIG. 12, in order to assure positive spring return of the output shaft 33' to a reference position, it is preferred that the spring 153 be preloaded prior to attachment of the spring return assembly 147 upon the actuator 10. Accordingly, the hub 57 includes a plurality of cylindrically shaped stop stud pockets 163 formed to a depth in the first face 165 of the hub 157 in a circumferentially spaced apart relationship one to the other and having their longitudinal axes parallel to the rotational axis of the hub 157 and the output shaft 33'. A plurality of counterbores 167 are formed in the hub second face 169 to have their longitudinal centerlines coincident with the corresponding centerline of the related stop stud pocket 163. A longitudinal passage 171 is concentrically formed between each counterbore 167 and its related pocket 163 and is sized to receive a stud retaining screw 173 with slight clearance. When it is desired to preload the spring return assembly 147, the hub 157 is manually rotated in a spring preloading direction until a desired preload is obtained. An appropriate stop stud 175 is thereupon inserted within a stud pocket 163 in a manner to prevent spring unwinding and thereby retain the preload. An appropriate stud 175 will have a threaded hole in the bottom thereof for receiving the retaining screw 173 and will have a length selected such that when the stud 175 is bottomed in its pocket 163, its projecting shoulder is of a height sufficient to engage a tang 177 formed in the backplate of the housing member 151. Mounting feet 179 having elongate apertures 181 formed therein are provided for fastening the spring return assembly 147 to the actuator enclosure 11.

It is to be appreciated that the spring 153 may be configured from ribbons of varying thicknesses, widths, lengths or a combination thereof to provide varying positioning torques. In a first preferred spring return configuration, the spring preload would be selected such that when the spring return assembly 147 is combined to an actuator 10 having a motor 15 of the second configuration, the preferred available output shaft torque is 25 lb-in. Similarly, a second preferred spring return configuration would employ a preload to result in an output shaft torque of 50 lb-in. when combined with a motor 15 of the third configuration.

Figure 13:
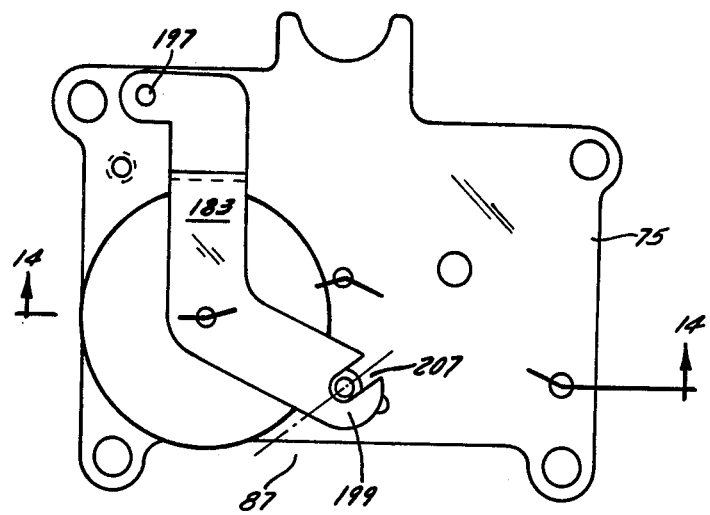
FIG. 13 is an end elevation view of a second embodiment of a gear assembly of the power transmission means taken along the plane 13—13 of FIG. 6.
Figure 14:
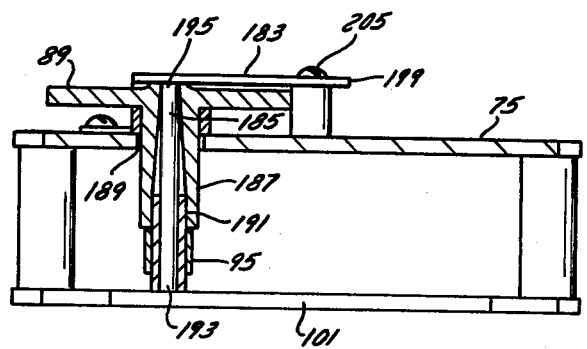
FIG. 14 is a bottom plan view of a portion of the gear assembly of FIG. 13 taken generally along the line 14—14 thereof and with portions shown in cross-section and other portions shown in full representation.
Figure 15:
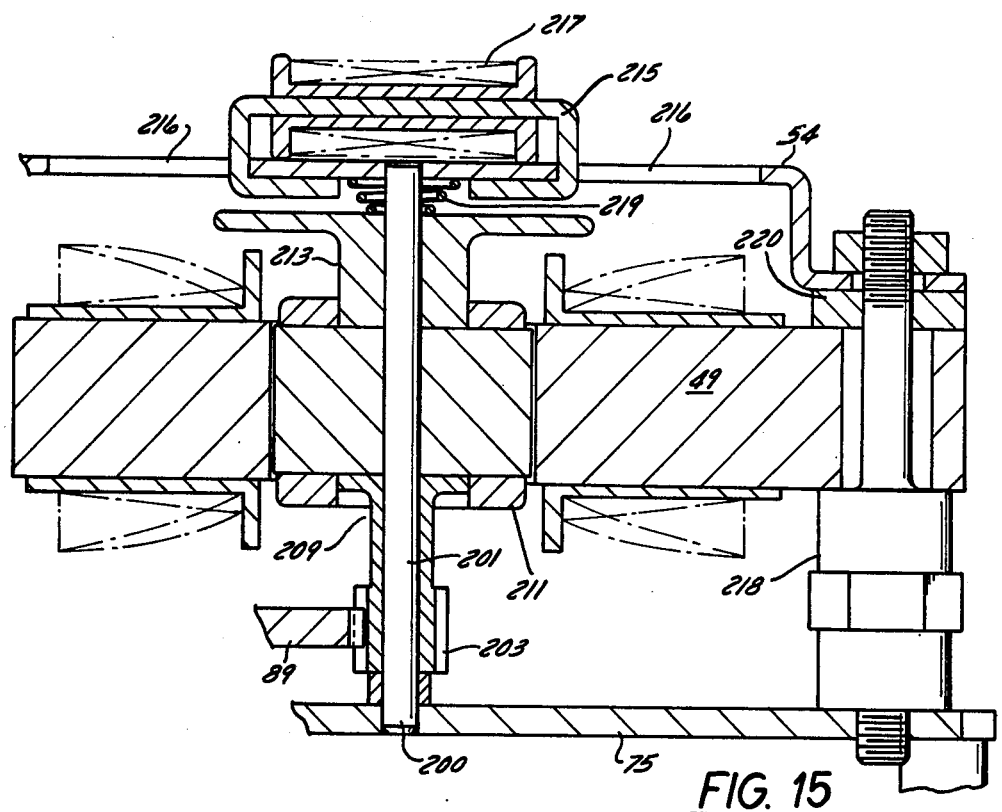
FIG. 15 is a side elevation view of a third embodiment of the actuator drive motor and generally corresponding to the plane of view of FIG. 4, with portions shown in cross section and other portions shown in full representation.

In certain applications requiring higher output torques and improved bearing life, it is desirable to eliminate the bronze bushings 99 used to rotatably support the first bull gear 89, the first pinion gear 95 and the spherical bronze bearings 59 used to support the rotor assembly 53. FIGS. 13 and 14 depict a second embodiment of the gear assembly 87 while FIG. 15 depicts a third embodiment of the motor 15. While the view of FIG. 14 is taken generally along the line 14—14 of FIG. 13, it should be understood that aspects of the adjustment bracket 183 described below are also included for clarity. The first bull gear 89 and first pinion gear 95 are shown in FIG. 14 to be rotatably supported upon a non-rotating axle 185, preferably formed of hardened steel. The shoulder 187 of the first bull gear 89 extends through an opening 189 in the second plate 75 with slight clearance therebetween to permit adjustment as described below. If a single material is used to form the gears 89, 95, the bull gear 89 and pinion gear 95 may be fabricated as a unitary structure. If disparate materials are required for the application, the pinion gear 95 will preferably include a neck member 191 sized to be received in a cavity within the first bull gear 89 with press fit. In the alternative, the mating portions of those gears 89, 95 may be formed to closely fitted, torque transmitting shapes such as a square or hexagon. A first end 193 of the axle 185 is press fitted to the first plate 101 while a second end 195 is supported by an aperture in an adjustment bracket 183, the latter having a first, pivot point 197 and a second, clamping end 199. An end 200 of the rotor shaft 57 is secured by press fit within a hole in the second plate 75 in a manner such that the motor pinion gear 63 is in driving engagement with the first bull gear 89. It is preferred that the pivot point 197, the center line of the axle 185 and the rotor shaft 57 center line define approximately a right angle. A stud and clamping screw 205 are disposed at the clamping end 199 of the bracket 183 and positioned to engage a slot 207 formed at the bracket end 199. Adjustment of the meshing position of the motor pinion gear 63 and the first bull gear 89 will thereby be facilitated and the clamping screw 205 thereafter tightened to maintain such adjustment. To effect smooth pivoting, it is preferred that the longitudinal slot axis and a line between the pivot point 197 and the clamping screw 205 also define a right angle.

As best seen in FIG. 15, the rotor assembly 53 includes a pinion gear portion 63, a rotor 55 and a brake member 213 assembled as a unitary structure and rotatably supported upon a stationary shaft 57, preferably formed of hardened steel. In those applications where solenoid-actuated braking is desired to be provided upon the motor 15, a generally C-shaped magnet clip 215 is received through slots 216 formed in the bracket 54 and has an electromagnetic coil 217 wound thereabout for brake actuation. If motor braking is desired, the coil 217 is actuated whereupon the rotor assembly 53 including the brake member 213 is magnetically drawn to the magnet clip 215 for frictional engagement therewith. Upon de-energization of the coil 217, a spirally wound biasing spring 219 urges the rotor assembly 53 to a position whereby the brake member 213 and the magnet clip 215 are in a spaced-apart relationship. A feature of this embodiment is that energization of the coil 217 and therefore actuator braking may be selectively controlled by external means.

In this embodiment, the motor stator 49 and bracket 54 are supported upon the second plate 75 by a pair of stand-off studs 73, only one of which is depicted. When clamping the stator 49 in position using the stud nut 220, accurate assembly and consequent free rotation of the rotor assembly 53 will be aided by the use of a gage block (not shown) temporarily fitted at the position of the rotor assembly 53. A suitable gage block will have a diameter only slightly in excess of the diameter of the rotor 55.

Figure 16:
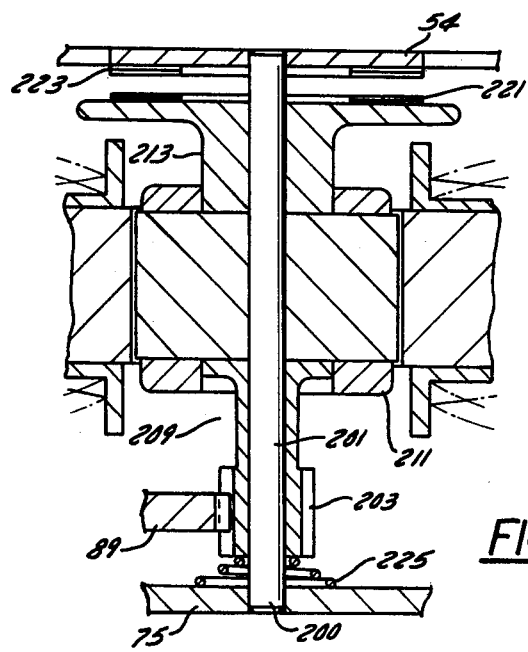
FIG. 16 is a side elevation view of a fourth embodiment of the actuator drive motor and generally corresponding to the plane of view of FIG. 4, with portions shown in cross section and other portions shown in full representation.

Referring next to FIG. 16, other applications may require that motor braking automatically occur whenever the motor 15 is de-energized. Accordingly, an annular friction disk 83 is affixed to the motor brake member 213 for frictional engagement with a second, similar disk 223 affixed to the bracket 54. A coiled spring 225 is disposed upon the shaft 57 intermediate the first pinion gear 63 and the second plate 75 for biasing the rotor assembly 53 to a braking position whenever the motor is de-energized.

Referring next to FIGS. 2, 10, 17, 18, 19 and 22, the electric control means 21 of the embodiments provides for rotation positioning control of the output shaft 33 in response to analog command signals. Positioning is by comparing a command signal representative of the desired shaft position with a feedback signal representative of the actual position of the shaft and selectively generating an error signal based thereon. The electric control means 21 is shown to include a first control circuit 227 (FIG. 17) having first means 229, preferably a potentiometer, for generating a signal representative of the actual angular position of the output shaft 33 and static switch means 231 for controllably energizing and de-energizing the drive motor 15. A trimming potentiometer 233 permits calibration to nullify the tolerances of the potentiometer 229 and the travel adjustment potentiometer 235 described in greater detail below. A phase-shifting capacitor 237 cooperates with the drive motor 15 for aiding in the determination of motor output torque. The electric control means 21 also includes a second control circuit 239 (FIG. 19) coupled to the first circuit 227 and being responsive to proportional voltage command signals which may be received thereat from a separately mounted proportional controller (not shown) and which are representative of a desired position of the actuator output shaft 33. The second control circuit 239 includes integrated circuit means 241 for controllably triggering the static switch means 231 to effect bidirectional rotation of the drive motor 15 between first and second angular positions of the output shaft 33 as dictated by the proportional voltage signals. When using the actuator 10 in certain applications, it is desirable to perform voltage transferring and conditioning operations upon voltages occurring within a first range of input voltages to permit the generation of voltages within a second range of input voltages wherein the voltages within the second range are proportional and of opposite polarity to those within the first range and a signal shift circuit 243 is provided for the purpose.

Figure 17:
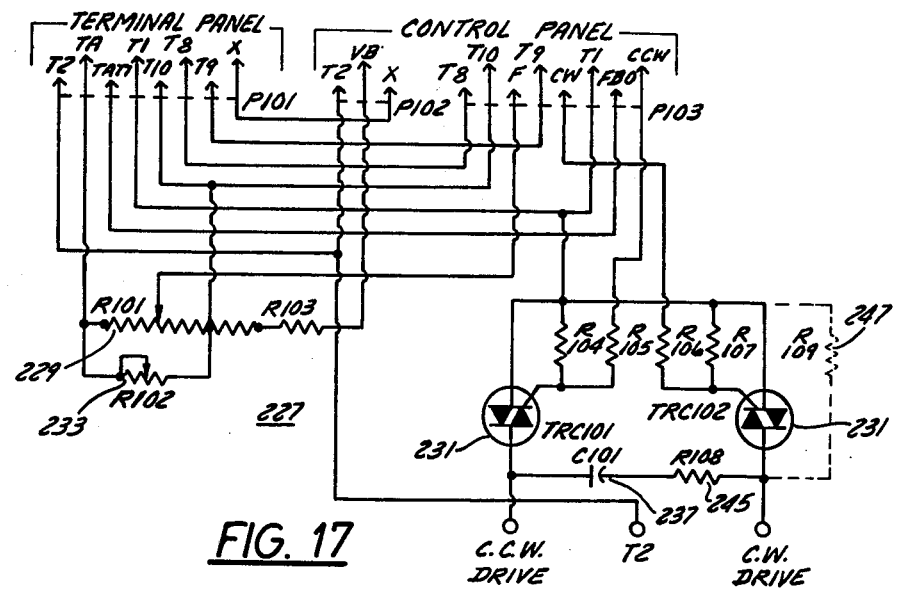
FIG. 17 is an electrical schematic diagram of the first circuit of the actuator electric control means with a portion shown in phantom.
Figure 18:
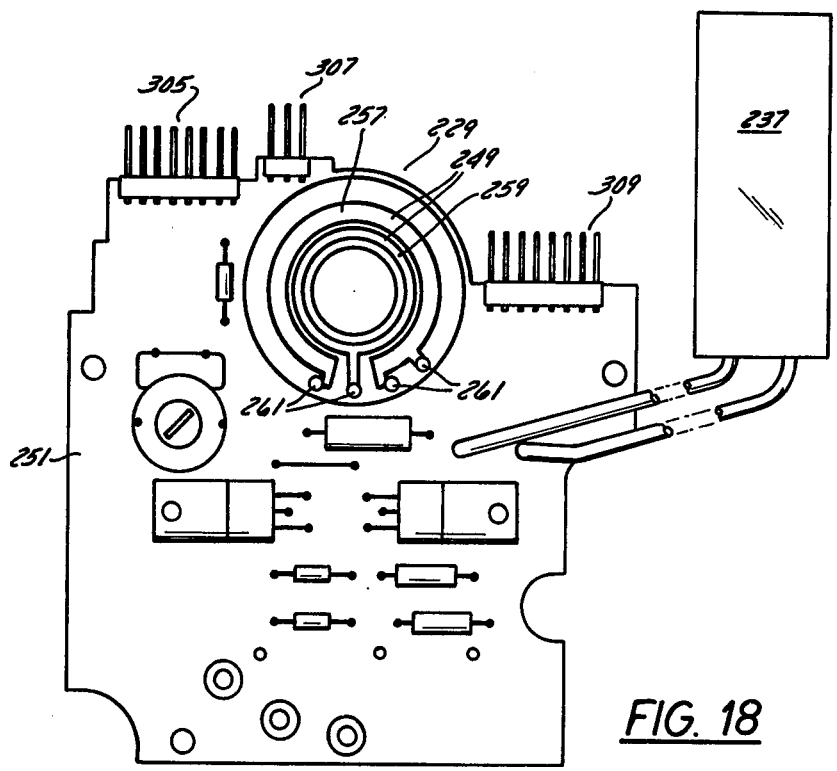
FIG. 18 is an elevation view of the first circuit board of the control means and embodying the circuit of FIG. 17.
Figures 19, 20, 21:
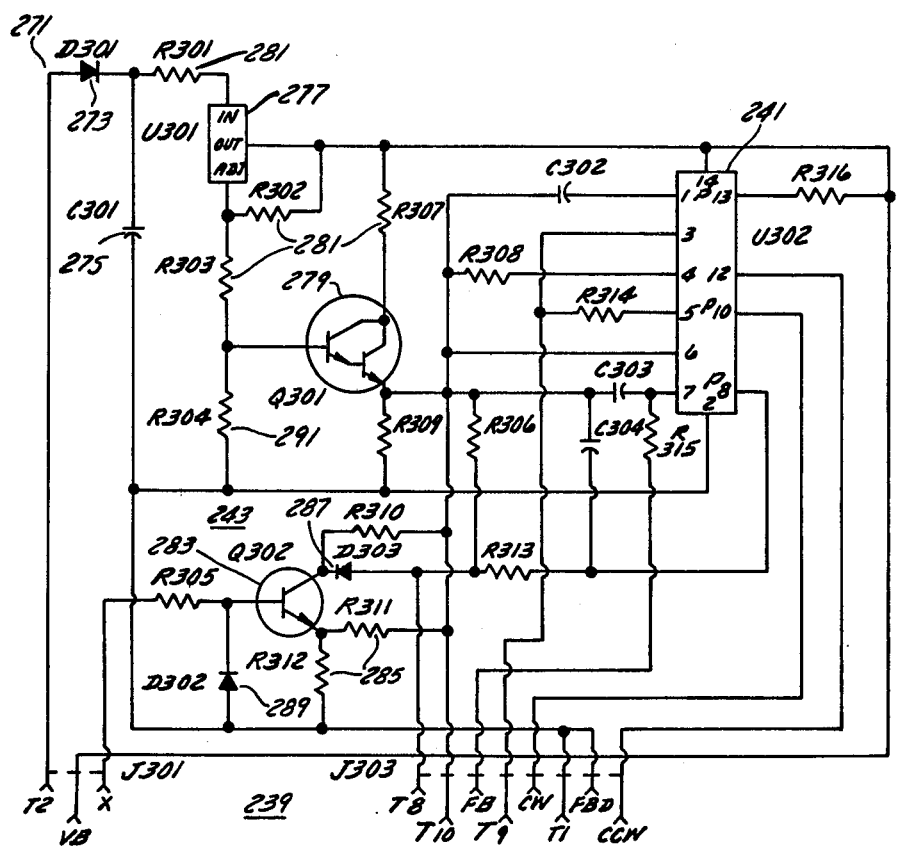
FIG. 19 is an electrical schematic diagram of the second circuit of the actuator electric control means.
FIG. 20 is a front elevation view of the actuator contactor disk.
FIG. 21 is a side elevation view of the contactor disk taken along the plane 21—21 of FIG. 20.

More particularly and as best seen in FIGS. 10 and 17, the first control circuit includes an actuator position feedback potentiometer 229, a plurality of motor control static switches 231 such as static triacs and a capacitor 37 coupled in series with its current limiting resistor 45. The potentiometer 229 provides a voltage signal representative of the actual output shaft position while the switches 231 are responsive to triggering signals received from the second control circuit 239 for selectively energizing and de-energizing the drive motor 15 in the absence of a triggering signal to either switch 231. Selective triggering of one of the two switches 231 will result in clockwise or counterclockwise rotation of the output shaft 33. In installations where it is preferable to incorporate the spring return assembly 147 upon the actuator 10, a biasing resistor 247 may be coupled in parallel with one of the switches 231 for partially energizing the motor 15 to counterbalance the torque generated by the spring return assembly 147. Referring additionally to FIGS. 20 and 21, the potentiometer 229 is shown to include a pair of circular, generally concentric conductive plastic resistor ribbons 249 disposed upon a 0.005 inch KAPTON substrate which is attached to the circuit board 251 embodying the first control circuit 227 and an electrically conductive shorting clip 253 disposed upon a movable contactor disk 255, the latter being formed of an insulating material. The resistor ribbons 249 include an interrupted, generally circular outer resistance ring 257 and a concentric, inner resistance ring 259 with each of the rings 257, 259 having connecting posts 261 coupled to other components of the first control circuit 227 as shown in FIG. 17. The shorting clip 253 is formed of a conductive spring material and includes a plurality of spaced apart fingers 263 for contacting the resistance rings 257, 259 and electrically shorting thereacross at the points of contact. The contactor disk 255 includes an aperture 265 sized to snugly engage the output shaft 33 for coincident rotation therewith and is held in resistance ring contacting engagement by a wiper clamp 267 attached to the shaft 33 with a setscrew. To help assure that rotation of the disk 255 is coincident with that of the shaft 33, the disk 255 includes a truncated cone-shaped nipple 269 protruding therefrom to engage a drive aperture formed in the clamp 267. KAPTON is a trademark of E. I. Du Pont.

Referring to FIG. 19, the second control circuit 239 includes a halfwave rectified, unregulated power supply 271 for generating a DC voltage by the application of an AC voltage at terminals X and T2 to a diode 273 and capacitor 275. A voltage regulator chip 277, a transistor 279 and a plurality of resistors 281 cooperate for providing +15 VDC and +12 VDC regulated supplies which are available at the pins VB and 10 respectively. The floating regulator 277 maintains a constant 1.25 VDC across the resistor 281 designated R302 and with the second control circuit 239 constructed and arranged as shown in FIG. 19, the voltage at the emitter of the transistor 279 is maintained at approximately 12 VDC. The resistor 281 designated R307 provides a current limiting function for the +12 VDC supply. The second control circuit 239 also includes an integrated circuit chip 241 for providing clipper, amplifier, comparator and output functions. A chip 241 which has been found useful in the second control circuit 239 is available from Johnson Controls, Inc. of Milwaukee, Wis. under part no. ICL18-1. The second control circuit 239 further includes a signal shift circuit 243 for selectively converting a first input voltage signal occurring within a predetermined first range to a second input voltage within a predetermined second range in a manner such that a second voltage within the second range is representative of a first voltage within the first range. In a preferred embodiment, the first range is +6 to +10 VDC while the second range is 0 to −2 VDC. Signal shifting is by biasing the emitter of a transistor 283 to a DC voltage established by the resistors 285. In a preferred embodiment, this voltage is 5.4 VDC. The transistor 283 commences conduction when its base voltage rises to a level equivalent to the voltage established by the resistors 285 added to the base-to-emitter voltage or a value of approximately 6 VDC. As the second input voltage continues to rise to a voltage in excess of 6 VDC, the control output voltage available at "8" VDC terminal decreases from 0 VDC, reaching a value of −2 VDC when the second input voltage reaches a value of +10 VDC, the voltages occurring within the first range and those resulting in the second range having a linear relationship one to the other. The second input voltage is coupled by a diode 287 into the "T8" terminal. It should be appreciated that the value of a first input voltage signal may be greater or less than the voltage value boundaries defining the first input range and such value may be, for example, 0 to +24 VDC. However, construction and arrangement of the second control circuit 239 as shown and described will cause it to be unresponsive to all first input voltage signals other than those occurring within the first input range. The component values described herein are selected such that when the transistor 283 becomes saturated to permit the flow of base current, the maximum voltage on the resistor 285 designated R312 is limited to 9 VDC maximum even though the value of the first input signal may exceed 9 VDC. In order to help avoid damage to the signal shift circuit in the event the "X" input terminal is driven with a signal having incorrect polarity, it is preferred that the shift circuit 243 further include a polarity protection means for isolating the shift circuit 243 from such voltages. To that end, a diode 289 is coupled at the base of the transistor 283.

In order to protect the integrated circuit chip 241 and other portions of the second control circuit 239 from damage due to certain types of misconnections, it is preferable to provide a protective circuit for damage prevention in the event of a power supply short circuit condition. Accordingly, a current demand imposed upon the +12 VDC supply which exceeds the saturation current of the transistor 279 will cause the transistor 279 to exhibit a flow of base current which results in a decrease in voltage drop across the resistor 291. If the +12 VDC supply is short circuited to the terminal "T1", the maximum short circuit current is maintained at the value of the saturation current of the transistor 279 and the output voltage of the +15 VDC supply will be reduced to approximately 3 VDC.

Figure 22:
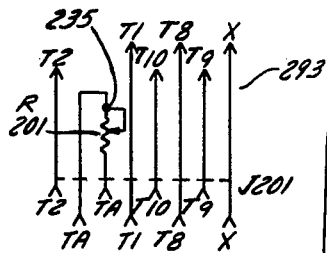
FIG. 22 is an electrical schematic diagram of the first terminating means of the electric control means, the same formimg a part of the first embodiment of the actuator.
Figure 23:
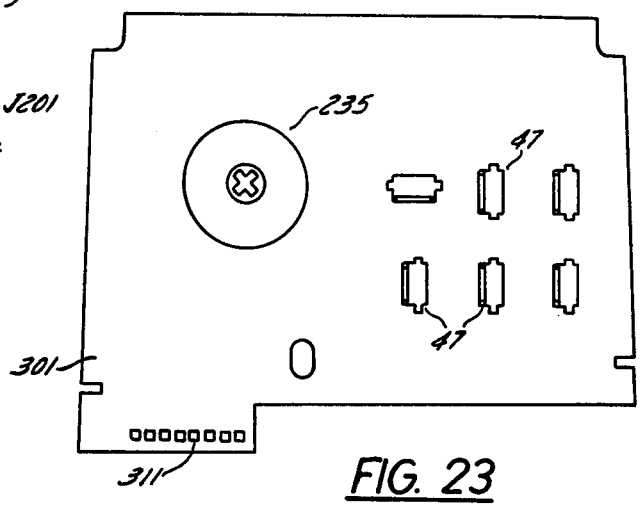
FIG. 23 is a plan view of the first terminating means circuit board and embodying the circuit of FIG. 22.
Figure 24:
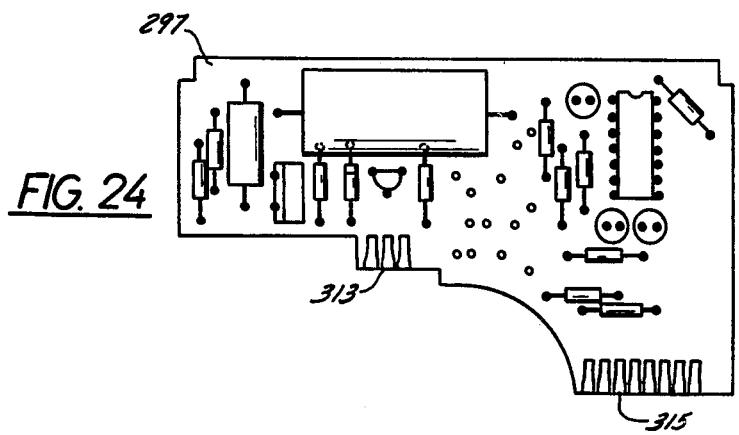
FIG. 24 is an elevation view of second circuit board of the control means and embodying the circuit of FIG. 19.

Referring to FIGS. 2, 22 and 23, while connection of incoming field wiring to the actuator 10 may be to terminal studs on the first control circuit board 251 or on a board embodying the second control circuit 239, wiring will be facilitated by the incorporation of optional first terminating means 293 having suitable terminals 47 as, for example, spade lugs for wiring attachment. Additionally, the terminating means 293 preferably incorporates a travel adjustment potentiometer 235 for preselecting a second angular position of the output shaft 33. It is convenient to arbitrarily designate the first angular position as being at 0° and the potentiometer 235 permits the selection of a second angular position within a predetermined range of angular positions. The resulting difference between the first and second positions defines the magnitude of the arc segment through which the output shaft 33 may be turned as the command signal changes from zero to full value. In the preferred embodiment, the predetermined range of angular positions is between 65° and 270°. Selection of a second angular position of 100°, for example, will permit the shaft 33 to rotate between the positions at O° and 100° over the full range of the command signal.

The family of circuits comprising the first control circuit 227, the second control circuit 239 and the terminating means 293 as well as the circuits of other embodiments described hereinafter may be constructed using individually wired components or, in the alternative, may each be assembled to printed circuit boards. It is preferable, however, to arrange the circuits of the embodiments so they may be conveniently fitted within the second compartment 19 in interfaced electrical connection according to the dictates of the application. Referring to FIGS. 2, 18, 23 and 24 and to that end, the control circuits 227, 239 and the terminating means 293 of the first preferred embodiment are each fabricated as discrete printed circuit boards configured such that the board 251 of first control circuit 227 may be received in a first location 295, the board 297 of the second control circuit 239 in a second location 299 and the board 301 of the terminating means 293 in a third location 303, all as seen in FIG. 2. When constructed and arranged in this manner, connections between the boards 251, 297, 301 may be readily accomplished using plug-in connectors. By way of illustrating the manner in which the boards 251, 297, 301 of the control circuits 227, 239 and the terminating means 293 may be fabricated to be readily received within the enclosure 11, the first control circuit board 251 of FIG. 18 embodies the schematic diagram of that same circuit 227 as shown in FIG. 17. The board 251 includes a first group 305 of upwardly extending, parallel, spaced-apart terminating studs for connection to the terminating means board 301 and a second group 307 and third group 309 of similarly arranged terminating studs for connection to the second control circuit board 297. The first terminating means board 301 includes a first group 311 of upwardly extending, generally parallel, spaced-apart terminating ferrules of generally tubular construction, each having an opening therethrough sized to slidably engage a correspondingly positioned stud of the first group 305 for electrical conduction therebetween. Similarly, a second control circuit board 297 includes a second group 313 and a third group 315 of terminating ferrules sized and located to slidably engage correspondingly positioned studs of the second group 307 and the third group 309 for electrical conduction therebetween. For convenience in connecting field wiring to the terminating means board 301, a plurality of spaced apart terminals 47 embodied as spade lugs are provided thereon and are formed to extend generally normal to the surface of the board 301.

As best seen in FIG. 2, an annular insulating disk 317 is disposed between the board 251 and the shoulder surrounding the third pocket 115 for the prevention of electrical short circuits at the inward side of the board 251. In order to securely support the second control circuit board 297 and to insulate its inward surface from accidental contact with adjacent metal parts, an L-shaped support bracket 319 is formed to engage the upper extremity of the board 297 for support while an insulating barrier 321 is interposed between the bracket 319 and the board 297 for electrically insulative protection of the latter.

In yet other applications, it is often desirable to make provisions whereby the HVAC system may be configured to provide an economizer function by coupling the system to a device sensitive to the enthalpy, i.e., sensible heat of the outside ambient air. When so used, the HVAC system is selectively disabled so that no energy is expended for cooling of air introduced into the conditioned space and the system relies instead upon the then-existing ambient air characteristics to maintain human comfort. Substantial savings in energy may thereby result. Additionally, it is desirable to permit the setting of outside air dampers to a slightly open position so that the minimum building ventilation requirements may be met.

Figure 26:
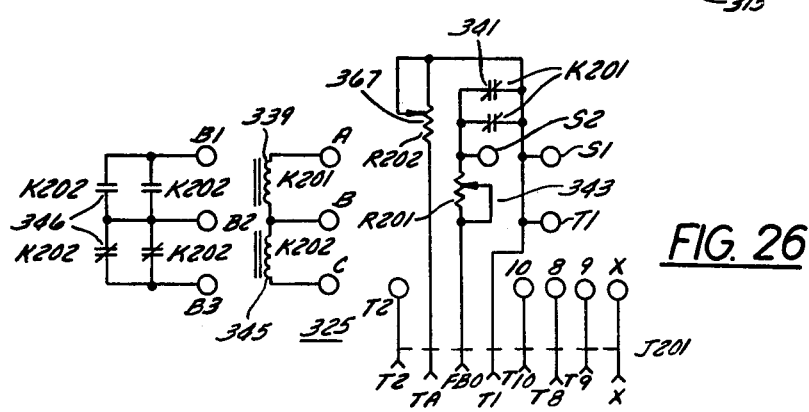
FIG. 26 is an electrical schematic diagram of the second terminating means of the control means, the same forming a part of the second embodiment of the actuator.
Figure 25:
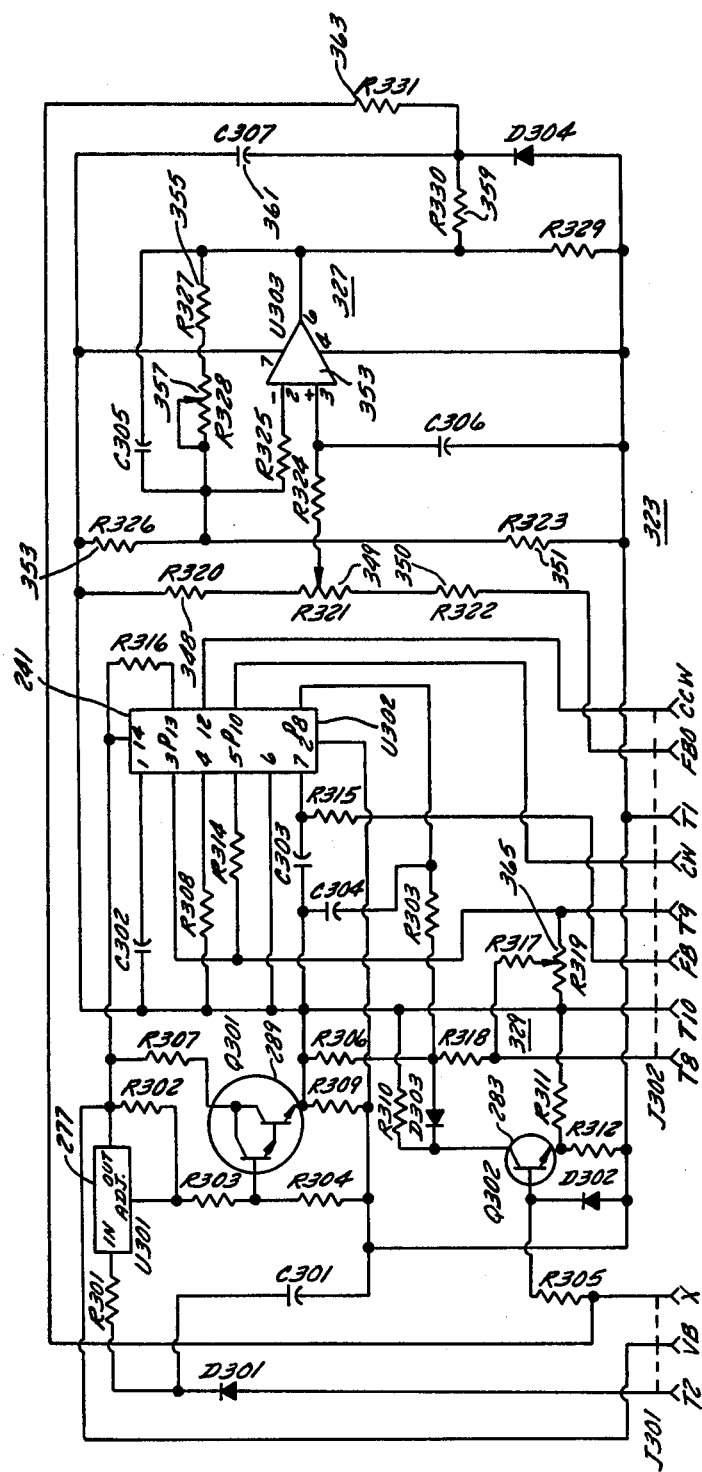
FIG. 25 is an electrical schematic diagram of the third circuit of the control means, the same forming a part of the second embodiment of the actuator.

Referring to FIGS. 10, 25 and 26, the electric control means of the second embodiment is shown to include a third circuit 323 and a second terminating means 325 used in place of the second circuit 239 and the first terminating means 293, respectively, of the first embodiment. The third circuit 323 includes, in addition to the basic triggering and signal shift circuitry shown in FIG. 19, a comparator means 327 for receiving a sensor signal representative of the actual temperature within a mixed air space of the air delivery system and for receiving a setpoint signal representative of the desired temperature within that space. The comparator means 327 selectively generates an error signal based upon a comparison of those signals for controllably positioning the actuator output shaft 33. The circuit 323 also includes a position adjustment means 329 for setting a minimum angular position of the output shaft 33 to provide a minimum damper opening. The third circuit 323 is preferably embodied in a third circuit board assembly 331 comprising a third circuit board 333 and a fourth circuit board 335 constructed and arranged to be received in the actuator enclosure 11 at the second location 299 and the fourth location 337 respectively, with connection therebetween by a multiconductor ribbon type harness (not shown). The electric control means of the second embodiment also includes a second terminating means 325 constructed and arranged in a printed circuit board to be received in the third location 303 within the enclosure 11 in place of the board 301.

As best seen in FIGS. 25 and 26, the second terminating means 325 includes a first relay having its coil 339 connected to terminals A, B for the application of an operating voltage. The contacts 341 of the first relay are connected in parallel with one another and with a pair of sensor terminals S1, S2 adapted to be connected to and receive signals from an external temperature sensor. A potentiometer 343 is provided for selecting the desired temperature setpoint. Arrangement in this manner will permit the coil 339 of the first relay to be controllably energized by a separately provided, enthalpy-sensitive economizer controller. The second terminating means 325 also includes a second auxiliary relay having a coil 345 and contacts 346 which may be discretionarily used by the installer.

More particularly, the comparator means 327 includes a resistance bridge comprised of the resistors 348, 349, 350, 351 and 352 for receiving a plurality of input voltage signals and selectively generating an error signal based thereon. The input voltage signal representative of the temperature within the conditioned space is received at the control circuit 323 at the terminal FBO while the input voltage representative of temperature setpoint signal is received at the terminal T1. Since the resulting error signal may have a magnitude insufficiently high to be useful as a control signal, it is preferable that the comparator means 327 also include an amplifier 353 for receiving the error signal at pin 3 thereof and amplifying it with a gain adjustable by the value of the fixed resistor 355 and the variable resistor 357. The output voltage appearing at pin 6 of the amplifier 353 is filtered by a resistor 359 and capacitor 361 then directed to the X input terminal through the resistor 363. The temperature sensor which is adapted to be coupled to the terminals S1, S2 of the terminating means 325 is preferably a thermistor of the positive temperature coefficient type which exhibits a resistance directly related to the sensed temperature. If the value of the sensed temperature declines, the resistance appearing across the terminals FBO and T1 of the second terminating means 325 will decrease, resulting in a decrease of the voltage at pin 3 of amplifier 353 and therefore at the output pin 6 thereof. Rotational positioning movement of the actuator output shaft 33 will occur whenever this voltage exceeds +6 VDC in the preferred embodiment and will cease when such voltage exceeds +10 VDC. It is to be appreciated that changes in the sensed temperature will cause rotational movement of the shaft 33 only when the coil 339 is energized to open the contacts 341 connected in parallel with the sensor. If the coil 339 is de-energized by an economizing controller, the sensor is electrically shorted and the actuator shaft 33 rotates to a minimum damper opening position as determined by the value of the resistor 365. It should be understood that the electric control means of the second embodiment is typically used with actuators from which the spring return feature is omitted and the portrayal in FIG. 10 is merely for illustrating the positioned locations 299, 337 within the enclosure 11.

In operation and with respect to the first embodiment of the actuator 10, the first circuit board 251, second circuit board 297 and the board 301 embodying the first terminating means 293 are assembled within the enclosure 11 as described above. Referring to FIG. 22, a preferred motor 15 may be operated at a preferred voltage of 24 VAC. within a preferred range of 20–30 VAC., the voltage being applied at terminals T1 and T2 of the first terminating means 293 with the former being common. It is to be appreciated that in the preferred configurations of the first circuit 227 and second circuit 239 described, the voltage at pin 10 with respect to pin 9 is +2 V. while the voltage at pin 10 with respect to T1 is +12 VDC. In the actuator 10 of the first embodiment, the potentiometer 235 is adjusted for preselecting the desired second angular position of the output shaft 33. In a first type of control mode, an external three-wire potentiometer (not shown) is coupled between pins 9 and 10, the slide wire thereof being coupled to pin 8. The potentiometer is actuable by, for example, a pressure or temperature sensor or may be manually manipulated.

In a second type of control mode, the input terminals of an electronic controller are coupled between pins 10 and T1. A preferred controller has an output terminal coupled to pin 8 for providing an output signal thereto which ranges between 0 VDC. and +2 VDC. A controller may provide such output signals to be representative of and based upon, for example, sensed temperature, pressure or humidity and controllers as made by Johnson Controls, Inc., of Milwaukee, Wis. are preferred.

In yet a third control mode useful with the first embodiment of the actuator 10, an input signal having a range of 0 VDC. to +24 VDC. is coupled between pins X and T1 with the former at positive polarity. In the preferred embodiment, rotation of the output shaft 33 will occur at signals within the +6 VDC. to +10 VDC. range.

Referring to FIG. 26 and with respect to the actuator 10 of the second embodiment for providing economizing functions, the second and third control modes described above will be useful. The potentiometer 367 provides the same function as the potentiometer 235 of FIG. 22 while the potentiometer 343 is used for selection of the economizing set point temperature at which mixing of outside air will occur to hold the selected temperature.

From the foregoing it should be understood that the rotary actuator 10 shown and described herein may be configured by the use of a variety of plug-in printed circuit boards to be adapted to any one of a wide variety of HVAC applications and control strategies. Further, construction and arrangement of the actuator 10 including its printed circuit boards in the manner shown and described will permit marketing merchants to stock basic models of the actuator including spring return and non-spring return versions and readily adapt them to any one of a wide variety of applications using stocked electric controller components.

The following components have been found useful in the construction of the preferred embodiments. Resistance is in ohms, 5% tolerance, ¼ w. unless otherwise specified; capacitance is in microfarads, 20% tolerance.

| FIG. 17 | | | |
|---|---|---|---|
| R101 | 10K and 1K, 10% | R109 | 62, 5w |
| R102 | 5K, 30% | TRC101, 102 | T106 |
| R103 | 3.3K | C101 | 23, 110VAC |
| R104, R107 | 1K | | |
| R105, R106 | 560, 0.5w. | | |
| R108 | 5.6, 2w, ww | | |
| FIG. 19 | | | |
| R301 | 130, 2w, ww | R314 | 750 |
| R302 | 243, 1% | R315 | 100K |
| R303 | 91 | R316 | 13K, 1% |
| R304 | 2.55K, 1% | C301 | 220, 50 V |
| R306 | 100K | C302 | 6.8, 25 V |
| R307 | 75 | C303, C304 | .22, 50 V |
| R308 | 2K, 1% | D301 | IN5060 |
| R309 | 5.1K | U301 | LM317 |
| R313 | 100K | U302 | ICX18-1X |
| | | Q301 | GES5307 |
| FIG. 22 | | | |
| R201 | 10K, 20% | | |
| FIG. 25 - see values for FIG. 19 plus: | | | |
| R305 | 27K | R312 | 2.7K |
| R310 | 1.2K | D302, D303 | IN4148 |
| R311 | 3.3K | Q302 | GES5822 |
| FIG. 26 | | | |
| R201 | 1.35K, 5%, 2w, ww | R202 | 10K, 20%, 2w, ww |

While only a few preferred embodiments have been shown and described herein, the invention is not to be limited thereby but only by the scope of the appended claims.

We claim:

1. A motor-driven actuator for providing rotary output torque and including:
a single electric drive motor having a stator adapted to be configured for providing one of a plurality of output torques;
power transmission means including a rotatable output shaft, said transmission means being coupled to said drive motor and including drive elements formed of disparate materials selected for transmitting one of said output torques, and;

electric control means coupled to said motor for providing continuous rotation positioning control of said output shaft in response to externally generated analog command signals received at said control means;

said electric control means including a first control circuit having means for generating a feedback signal representative of the actual angular position of said output shaft and a second control circuit responsive to said command signals, said second control circuit including signal shift circuit means for selectively converting an externally generated first input voltage signal received at said control means and occurring within a predetermined first range to an internally generated second input voltage occurring within a predetermined second range.

2. The invention set forth in claim 1 wherein said positioning control is by comparing said command signal representative of the desired shaft position with said feedback signal and selectively generating an error signal based thereon.

3. The invention set forth in claim 2 wherein said actuator includes a housing and said first and second control circuits are embodied within at least one printed circuit board received within said housing.

4. The invention set forth in claim 3 wherein said electric control means further includes first terminating means for the connection of wiring thereto, and potentiometer means for selecting a limit of the rotation of said output shaft.

5. The invention set forth in claim 4 wherein said electric control means further includes second terminating means adapted to be coupled to a temperature sensor, said second terminating means including means for selecting a temperature setpoint and means for disabling said temperature sensor.

6. A motor-driven actuator for providing rotary output torque and adapted for use in process control systems, said actuator including:

electric drive motor means having a stator adapted to be configured for providing one of a plurality of output torques;

power transmission means including a rotatable output shaft, said transmission means being coupled to said drive motor means and including a plurality of gear elements rotatably supported by a plurality of spindles having axes generally parallel one to the other, at least one of said gear elements being formed of a first material, at least another of said gear elements being formed of a second material, said materials being selected from a group of materials including steel, powdered metal and plastic;

electric control means coupled to said motor means for providing rotation positioning control of said output shaft by comparing an externally-generated command signal representative of a desired position of said shaft with a feedback signal representative of the actual position of said shaft and selectively generating an error signal based upon said comparison.

7. The invention set forth in claim 6 wherein the gear elements of said power transmission include a pinion gear coupled to said motor, a first bull gear in driven engagement with said pinion gear, intermediate gear means in driven engagement with said first bull gear and an output bull gear in driven engagement with said intermediate gear means.

8. The invention set forth in claim 7 wherein said first bull gear is rotatably supported by first spindle means, said intermediate gear means is rotatably supported by second spindle means and said output bull gear is rotatably supported by third spindle means comprising said output shaft, the location of the rotational axes of said spindle means remaining fixed irrespective of the materials from which said gear elements are formed.

9. The invention set forth in claim 8 wherein said actuator further includes retarder brake means for retaining the actuator output shaft at its last commanded angular position when said motor is de-energized.

10. The invention set forth in claim 8 wherein said actuator further includes means for returning said actuator output shaft to a predetermined reference position whenever said drive motor is de-energized.

* * * * *

UNITED STATES PATENT AND TRADEMARK OFFICE
CERTIFICATE OF CORRECTION

PATENT NO. : 4,482,847
DATED : November 13, 1984
INVENTOR(S) : George Rudich, Jr.; Charles F. Beeson; Gary L. Bartley It is certified that error appears in the above-identified patent and that said Letters Patent are hereby corrected as shown below:

Column 1, Line 42 "driven-rotary" should be --driven rotary--

Column 3, Line 63 "phantom." should be --phantom--

Column 4, Line 29 "formimg" should be --forming--

Column 8, Line 31 "57" should be --157--

Column 9, Line 33 "57" should be --201--

Column 9, Line 35 "63" should be --203--

Column 9, Line 37 "57" should be --201--

Column 9, Line 42 "63" should be --203--

Column 9, Line 49 "53" should be --209--

Column 9, Line 50 "63" should be --203--

Column 9, Line 50 "55" should be --211--

Column 9, Line 52 "57" should be --201--

Column 9, Line 60 "53" should be --209--

Column 9, Line 64 "53" should be --209--

Column 10, Line 3 "73" should be --218--

Column 10, Line 6 "53" should be --209--

UNITED STATES PATENT AND TRADEMARK OFFICE
CERTIFICATE OF CORRECTION

PATENT NO. : 4,482,847                      Page 2 of 2

DATED : November 13, 1984

INVENTOR(S) : George Rudich, Jr.; Charles F. Beeson; Gary L. Bartley

It is certified that error appears in the above—identified patent and that said Letters Patent are hereby corrected as shown below:

Column 10, Line 8 "53" should be --209--

Column 10, Line 10 "55" should be --211--

Column 10, Line 14 "83" should be --221--

Column 10, Line 17 "57" should be --201--

Column 10, Line 18 "63" should be --203--

Column 10, Line 19 "53" should be --209--

Column 10, Line 65 "37" should be --237--

Column 10, Line 66 "45" should be --245--

Signed and Sealed this

Eighteenth Day of June 1985

[SEAL]

Attest:

DONALD J. QUIGG

Attesting Officer      Acting Commissioner of Patents and Trademarks